Patented Jan. 31, 1933

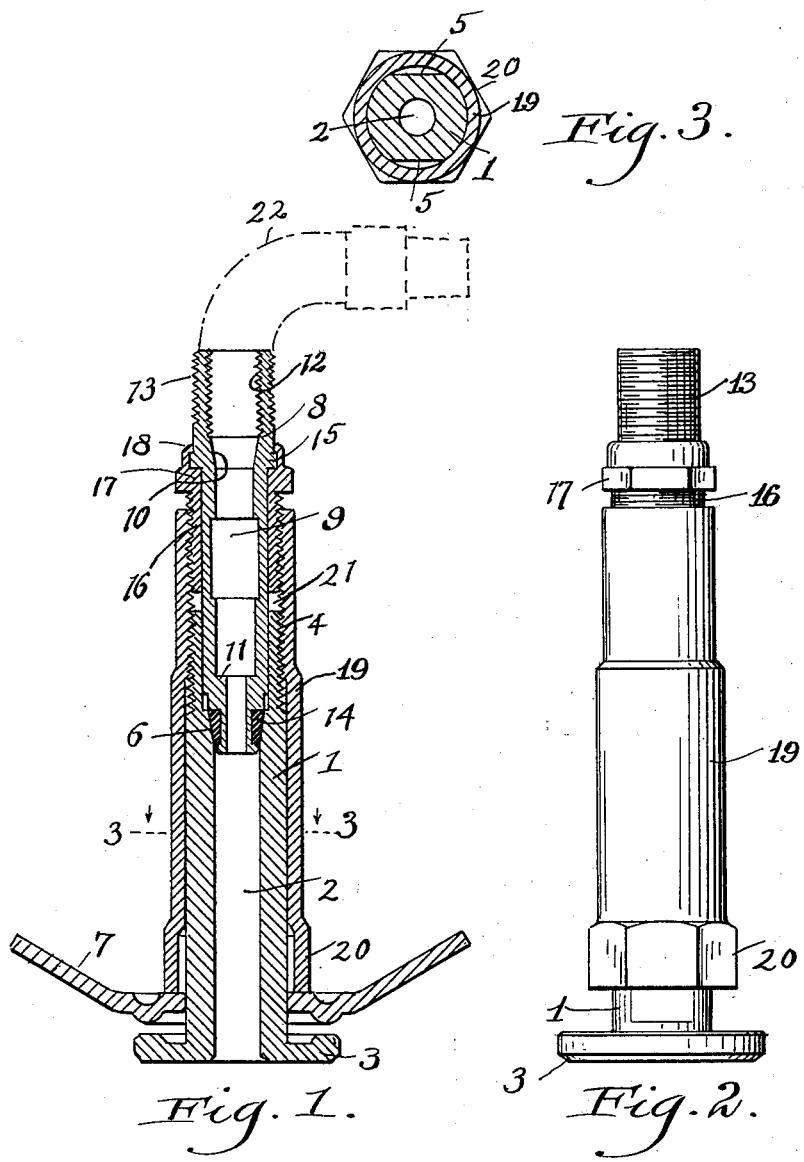

1,895,450

UNITED STATES PATENT OFFICE

JOHN C. CROWLEY, OF CLEVELAND HEIGHTS, OHIO, ASSIGNOR TO THE DILL MANUFACTURING COMPANY, OF CLEVELAND, OHIO, A CORPORATION OF OHIO

VALVE STEM

Application filed May 31, 1929. Serial No. 367,314.

This invention relates to valve stems and is more particularly directed to a valve stem provided with an adapter whereby a valve stem of other than the usual standard construction may be equipped to use a standard valve insides.

An object of this invention is to provide a valve stem and adapter construction wherein the packed joint between the adapter and its seat in the valve stem can be adjusted independently of the position of the sleeve which surrounds the valve stem and is in engagement with the spreader plate.

Another object is to provide a valve stem and adapter construction which is simple and is formed of a minimum number of parts.

Additional objects and advantages will become apparent as the description of the invention proceeds.

Reference should be had to the accompanying drawing forming part of this specification and disclosing an embodiment of the invention, in which:

Fig. 1 is a longitudinal sectional view through the valve stem and adapter, a slightly modified form of adapter being indicated by dotted lines;

Fig. 2 is an elevational view of the valve stem and adapter; and

Fig. 3 is a sectional view taken substantially on line 3—3 of Fig. 1 looking in the direction of the arrows.

As is well know the present conventional type of valve stem is usually a tubular piece of brass, one end of which is exteriorly threaded, the stem being provided with a central bore which has adjacent its outer end a tapered shoulder adapted to cooperate with a portion of a standard valve insides having a packing member engaging with such shoulder. The standard valve insides is provided with a threaded exterior portion adapted to engage with threads formed upon the inner bore at the end of the valve stem. These valve stems are made of brass in order to provide for an easy insertion or removal of the valve insides and prevent the same from becoming frozen within the stem after they have been assembled for a long period of time and subjected to weather conditions. In order to make the stem of a less expensive material and at the same time permit of the use therewith of a standard valve insides, I will in the present application describe an adapter suitable for use in connection with such valve stem or with any other valve stem whereby a standard valve insides may be used with such a stem. It is proposed to form the valve stem of steel or an equivalent low cost metal and to form the adapter of a non-corroding metal such as brass which is, relatively speaking, a high cost metal.

Referring to the drawing, a tubular member 1 is provided with an internal bore 2 and has at one end a head 3 and at its opposite end exterior threads 4. The member 1 is also provided adjacent the end thereof upon which is located the head 3 with flats 5, the purpose of which will later be made apparent. The interior bore 2 of the member 1 is provided with a tapered shoulder 6 intermediate the upper and lower portions of the bore, the latter portion of which is of a reduced diameter. A spreader plate 7 provided with a central opening having flats corresponding to the flats 5 on the member 1 is adapted to be positioned upon the member and to clamp a portion of an inner tube between it and the head 3, the cooperating flats on the two members effecting a proper positioning of the spreader and preventing its rotation relative to the member. The adapter comprises a body portion 8 which is provided with an internal bore 9 extending entirely through the same. This internal bore 9 is provided adjacent one end of the adapter with a tapered shoulder 10 and at another point within the adapter with a shoulder 11. The adapter is provided with internal threads 12 in the end thereof adjacent the shoulder 10 and also with external threads 13 adjacent such end. The threads 12 are adapted to receive the threaded plug of a standard valve insides and the shoulder 10 is adapted to cooperate with the usual packing member which is carried by the standard valve insides to prevent escape of air around the valve insides. The lower end of the adapter is formed with a reduced diameter, such end being provided with an annular groove within which is arranged a packing gasket 14 adapted to cooperate with the walls of the lower and smaller portion of the bore 2 and especially the tapered shoulder 6 when the adapter is fully positioned within the member 1 to provide an air-tight engagement between the adapter and the member. Intermediate the ends of the adapter, there is provided an outwardly extending annular flange 15 which cooperates with a member now to be described.

In order to hold the adapter in the member 1, as well as to force the same into proper assembly therewith, a threaded bushing 16 is rotatably arranged on the adapter, such bushing having at its upper end a hexagonal or other shaped head 17 from which extends an annular retaining flange or collar 18 engaging over the rib 15 of the adapter. It will thus be seen that the adapter and the threaded bushing 16 are connected together with a swivel connection so that when the threaded bushing is screwed into a fixed receiving member, it will be free to rotate relatively to the adapter and at the same time will force the adapter longitudinally into such member. Therefore, a sleeve 19 is arranged upon the stem 1, which sleeve is substantially longer than the stem so that it will extend beyond the end thereof when the parts are in the fully assembled position. The sleeve 19 has at its lower end a hexagonal or other shaped enlargement 20 adapted to bear upon the spreader plate 7 so that when the sleeve is threaded upon the stem 1, it will force such plate toward the head 3 of the stem to clamp the inner tube between the plate and the head. The outer end of sleeve 19 is internally threaded at 21, a portion of such threads cooperating with the threads 4 on the stem so that the sleeve may be threaded thereon and force the spreader plate into clamping engagement while the remaining portion of the threads are on that part of the sleeve which extends beyond the end of the stem 1.

In assembling the parts of the device, the sleeve 19 is first threaded onto the stem until the spreader plate has been forced into clamping engagement with the head, after which the adapter and the threaded bushing 16 are positioned so that the adapter extends into the bore 2 of the member 1 while the threaded bushing 16 extends into the end of the sleeve 19 with the threads thereof cooperating with the threads of the sleeve. It will thus be seen that, when the bushing 16 is rotated, the head 17 thereof forming a convenient wrench engaging surface for this purpose, the bushing will move longitudinally into the sleeve and will, therefore, because of its swivel engagement with the adapter force the latter into the bore in the member 1 until the packing 14, carried by the adapter, will be firmly compressed within the reduced portion of the bore so as to prevent escape of air. The construction just described enables the adapter to be adjusted with respect to the bore of the member 1 independently of the sleeve, which, after being initially assembled does not have to be adjusted or otherwise moved. Of course, in the case of disk or other type wheels requiring the valve insides to be located at a point adjacent the tire rim flange, an adapter in the form of an elbow would be used, such an adapter being indicated at 22, by the dotted lines in Fig. 1, it being understood that the interior threads and the tapered shoulder of the adapter which cooperate with the valve insides would be arranged adjacent the outer end of the curved adapter. It should be understood that the invention is susceptible of various modifications and adaptations within the scope of the appended claims.

Having thus described my invention, what I claim is:

1. In combination with an externally threaded valve stem having an internal bore and a head at one end, an adapter member extending within said bore and having a portion cooperating with the wall thereof to form an air-tight seal, an internally threaded sleeve arranged on said valve stem and extending from adjacent the valve stem head beyond the outer end of the stem a substantial distance, and externally threaded means having a swivel connection with said adapter cooperating with the extending end of said internally threaded sleeve for securing the adapter to the valve stem and for moving the same thereinto to form the aforesaid air-tight seal.

2. The combination with a valve stem having exterior threads adjacent one end thereof and a head adjacent the other end thereof and being provided with an internal bore, of an adapter member having a portion extending within said stem and provided with means cooperating with the wall of the bore of the stem to form an air-tight seal, an internally threaded sleeve arranged on the valve stem and engaging with the threads upon the exterior thereof, said sleeve extending from a substantial distance beyond the threaded end of the valve stem to adjacent the head thereof and an exteriorly threaded bushing arranged on said adapter member and having a swivel connection therewith, said bushing being threaded within the extension of said sleeve beyond the end of the stem whereby when said bushing is rotated, said adapter will be moved longitudinally into the bore of the stem.

3. The combination with a valve stem having an internal bore and having a portion adjacent one end exteriorly threaded and a head adjacent its other end, an adapter member extending within the bore of said valve stem and having means cooperating with the wall thereof for forming an air-tight seal, the said member being provided with an external flange, a sleeve arranged on said valve stem and extending from a substantial distance beyond the threaded end thereof to a point adjacent the head, said sleeve being provided with internal threads cooperating with the exterior threads of the valve stem, an exteriorly threaded bushing arranged on said adapter and having a flanged collar engaging the external flange thereon and effecting a swivel connection therewith, said bushing being threaded in said sleeve beyond the threaded end of the valve stem whereby when the bushing is rotated, the adapter will be forced longitudinally into the bore of the valve stem.

In testimony whereof, I hereunto affix my signature.

JOHN C. CROWLEY.